July 9, 1963 — E. C. McRAE — 3,096,662
ENGINE ACCESSORY DRIVE
Filed Dec. 6, 1961 — 2 Sheets-Sheet 1

INVENTOR.
Edwin C. McRae
BY

INVENTOR.
Edwin C. McRae
BY

United States Patent Office 3,096,662
Patented July 9, 1963

3,096,662
ENGINE ACCESSORY DRIVE
Edwin C. McRae, 3348 NE. 29th Ave.,
Pompano Beach, Fla.
Filed Dec. 6, 1961, Ser. No. 157,886
14 Claims. (Cl. 74—336)

This application describes an accessory drive unit which incorporates improvements over the inventions disclosed in my United States Patents 2,945,482, 2,911,962, and 2,911,961.

Inasmuch as the invention disclosed herein is designed to accomplish substantially the same results as the devices disclosed in the above mentioned patents, the objects of the invention will not be repeated herein. The improvement disclosed in this application, over that shown in the above mentioned patents, comprises means for driving the water pump of the vehicle engine at a constant speed ratio relative to the vehicle engine, while reducing the speed ratio of the fan, power steering pump, and air conditioning compressor at all speeds above a predetermined engine speed.

Tests conducted with the devices described in the above mentioned patents have shown that speed of the engine cooling fan can be safely reduced to a lower speed than that permissible with the patented devices if the engine water pump is driven at a constant speed relative to the engine. The object of this invention is, therefore, to provide means for driving the water pump at a fixed ratio relative to the vehicle engine and to reduce the driving ratio of the fan, power steering pump and air conditioner compressor when the vehicle engine reaches a pre-determined speed.

Other objects and advantages of this invention will be made more apparent from the following description when considered in connection with the accompanying drawings wherein.

Figure 1:
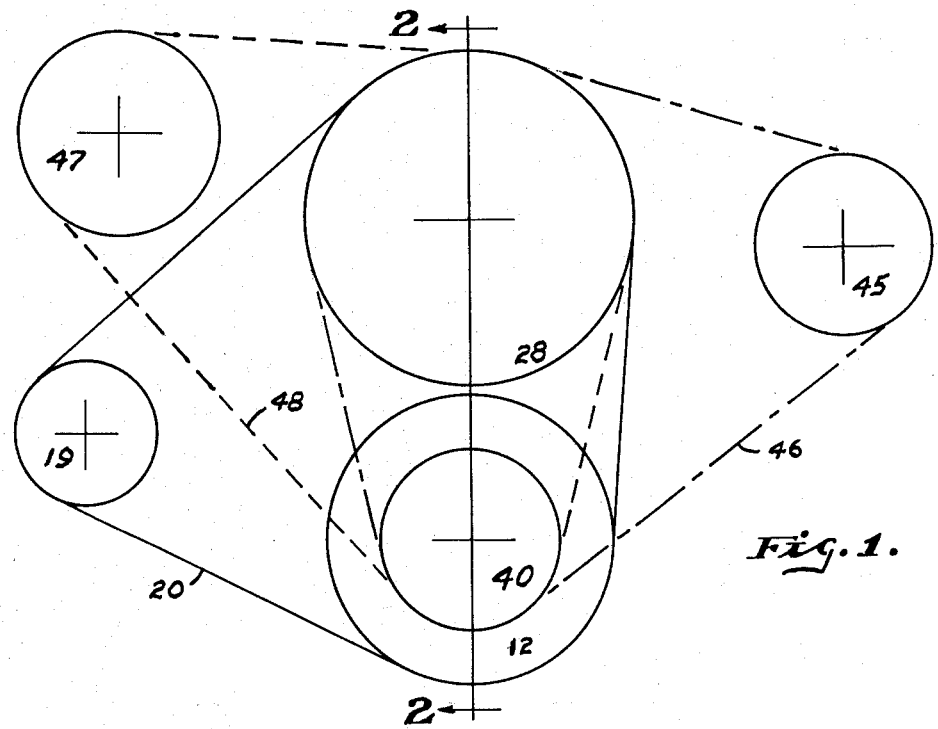
FIG. 1 is a diagrammatic view of the front end of a vehicle engine showing the pulley arrangement for driving the fan, water pump, power steering pump, generator or alternator and air conditioner compressor.

Referring to the accompanying drawings I have used the reference numeral 10 to indicate the front cover plate of a vehicle engine through which projects a crankshaft 11. A crankshaft pulley 12 is fixed to the forward end of the crankshaft 11 so as to be driven thereby. A water pump housing 13 is fixed to the cover 10 in position spaced from the crankshaft 11 and a pump shaft 14 is rotatably mounted in the housing 13 upon a suitable bearing assembly 15. A water pump impeller 16 is fixed to the rear end of the shaft 14 and a driving flange 17 is fixed to the forward end of this shaft. Both the impeller 16 and the flange 17 are pressed on the shaft 14 so that they are non-rotatably affixed thereto. A water pump driving pulley 18 is secured to the flange 17 in alignment with the crankshaft pulley 12.

A generator or alternator is provided for the engine, having a driving pulley 19 fixed to the generator shaft in alignment with the pulleys 12 and 18. A belt 20, shown by solid lines in FIG. 1, extends around the pulleys 12, 18 and 19 so that the water pump and generator will be driven by the engine at a constant speed ratio at all times that the engine is operating. I have used the term generator in this specification to designate either a generator or alternator.

A fan shaft 21 is bolted to the forward face of the flange 17 with the hub of the pulley 18 clamped between the shaft and the flange. A sleeve 22 is rotatively mounted upon the shaft 21 by means for a needle roller bearing assembly 23. An oil seal 24 is fixed in the sleeve 22 rearwardly of the bearing 23 and a thrust flange 25 extends inwardly from the sleeve 23 over the forward end of the shaft 21. A thrust washer 26 is bolted to the shaft 21 over the flange 25 to prevent axial movement of the sleeve 22 relative to the shaft 21. A fan 27 is bolted to the sleeve 22 so as to enclose the outer end thereof and form an oil reservoir to lubricate the thrust flange 25 and bearing assembly 23.

Figure 3:
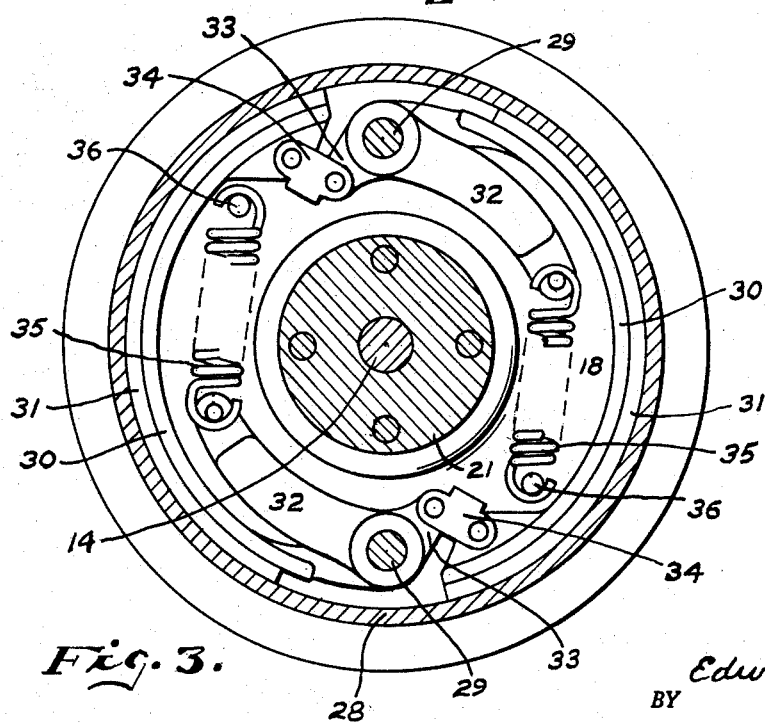
FIG. 3 is a sectional view, taken on the line 3—3 of FIG. 2.

The sleeve 22 forms a hub for a clutch ring 28 and a centrifugally actuated friction clutch couples the pulley 18 to the ring 28 at all engine speeds below about 2000 r.p.m. This clutch is shown in detail in FIG. 3, from which it will be seen that a pair of diametrically opposed anchor pins 29 are fixed to the pulley 18 and a clutch shoe 30 is pivotally mounted on each pin 29. Clutch lining 31 is rivetted or bonded to the outer face of each shoe 30 in position so that when the shoes are swung outwardly around their anchor pins the linings will engage the clutch ring 28 to thereby frictionally couple the pulley 18 to the clutch ring. A centrifugally actuated weight 32 is pivotally mounted on the outer end of each pin 29 and each of these weights are provided with an actuating arm 33 cast integrally therewith. A link 34 connects the end of each arm 33 with the free end of the opposite clutch shoe 30 so that when the weights move outwardly the shoes will be drawn inwardly away from the clutch ring 28. Conversely, when the weights 32 are moved inwardly the shoes 30 will be forced outwardly to engage the clutch ring. A pair of tension springs 35 connect the free ends of the weights 32 with spring anchor pins 36 which extend from the pulley 18. The springs 35 urge the weights 32 inwardly to apply the clutch shoes to the clutch ring. It is only when the pulley 18 rotates fast enough to throw the weights 32 outwardly against the tension of the springs 35 that the clutch is released.

Figure 2:
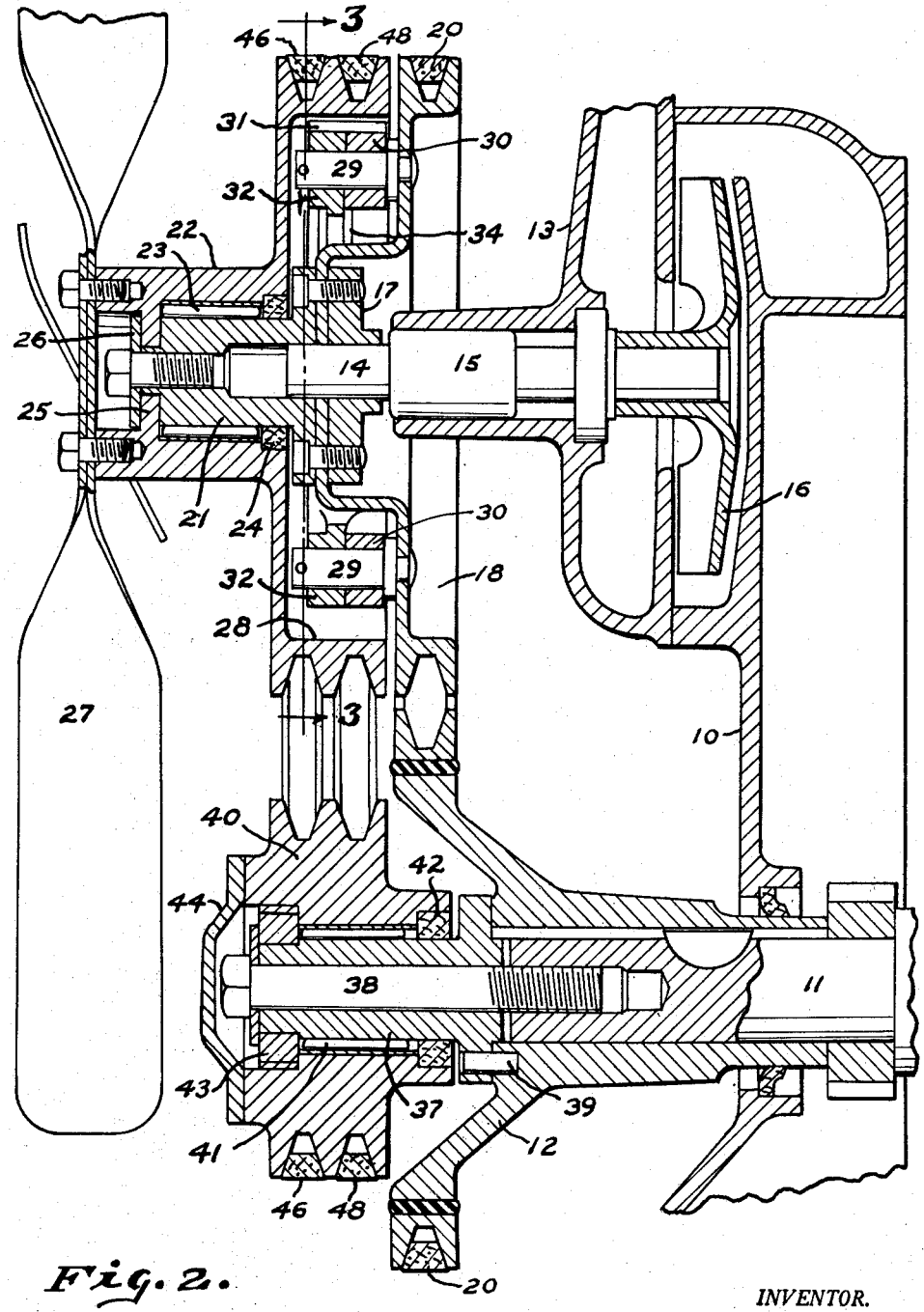
FIG. 2 is a sectional view, taken on the line 2—2 of FIG. 1

Referring to FIG. 2, it will be seen that a stub shaft 37 is secured to the outer face of the crankshaft pulley 12 by means of a bolt 38 and driving pin 39. The stub shaft 37 forms a continuation of the crankshaft 11. A low speed driving pulley 40 is rotatably mounted upon the stub shaft 37 by means of a roller bearing assembly 41. The pulley 40 is substantially smaller in diameter than the pulley 12 to effect a low speed drive for the engine accessories, as will later be described. An oil seal 42 is secured in the inner end of the pulley 40 which prevents dirt from entering the bearing assembly. An overrunning clutch assembly 43 is housed in the pulley 40 and co-acts with the outer end of the stub shaft 37. The clutch 43 is preferably of the sprag type but may be a roller clutch or any other suitable overrunning clutch. The clutch is arranged so that normal rotation of the crankshaft will drive the pulley 40 at crankshaft speed but the clutch 43 will permit the pulley 40 to rotate faster than the crankshaft at any engine speed. A cover plate 44 is secured over the front end of the pulley 40 to form an oil reservoir for the bearing 41 and overrunning clutch 43.

The pulley 40 is provided with a pair of V-belt grooves which are axially aligned with a similar pair of V-belt grooves machined in the outer periphery of the clutch ring 28.

The engine is provided with a power steering pump having a driving pulley 45 fixed to its pump shaft in axial alignment with the front pulley groove in the clutch ring 28 and front groove in the pulley 40. A V-belt 46, shown in dot and dash lines in FIG. 1, extends around the pulley 45, clutch ring 28 and pulley 40. When the clutch ring 28 is clutched to the pulley 18 the power steering pump will be driven by the pulley 18, and when the clutch ring 28 is disengaged from the pulley 18 the power steering pump will be driven by the pulley 40 directly from the engine crankshaft.

From the foregoing it will be seen that when the engine is operating at speeds below that at which the clutch ring 28 is disengaged from the pulley 18, the water pump, fan, generator and power steering pump will be driven at a high speed ratio relative to the engine crankshaft, and that when the engine is operating at a speed sufficient to disengage the clutch ring 28, the water pump and generator will still be driven at the high speed ratio, but the fan and power steering pump will be driven by the pulley 40 at a low speed ratio relative to the engine crankshaft.

Other accessories may also be driven by either the pulley 40 or pulley 12, and in the device shown I have provided an air conditioning compressor having a driving pulley 47 fixed to the compressor shaft in alignment with the rear groove in the pulley 40. A V-belt 48 extends around the pulley 47, rear groove in the clutch ring 28 and the rear groove in the pulley 40. This belt is shown by dotted lines 48 in FIG. 2. The compressor will thus be driven at the same speed ratio as the fan and power steering pump.

An advantage of this arrangement over that obtained by the constructions shown in the above mentioned patents is that the water pump is always driven at substantially engine speed, to thereby circulate the cooling fluid through the engine and radiator at a speed proportional to the speed of the engine. This causes the radiator to operate at a higher temperature than with my previously patented devices, and allows the fan to operate at a slower speed to produce adequate cooling of the radiator. The extra power required to run the water pump at engine speed is more than offset by the lower fan speed permitted because of the higher radiator temperature. An increased amount of power is required to drive the generator at engine speeds over its full range, but this increase is very little because the power requirements of a generator or alternator are nearly proportional to the current output regardless of the speed of operation. In this respect it differs from the power required to operate the cooling fan which increases as the cube of the fan speed and the power required to operate the power steering pump which increases directly with engine speed.

Some changes may be made in the arrangement and design of the various elements comprising this invention without departing from the spirit thereof, and it is my intention to cover by my claims such changes as may reasonably be included within the scope of this invention.

I claim as my invention:

1. In a device of the character described, a motor vehicle engine having a crankshaft, a water pump shaft associated with said engine in position radially spaced from said crankshaft, a crankshaft pulley fixed to said crankshaft, a water pump pulley fixed to said water pump shaft, a high speed belt extending around said water pump pulley and said crankshaft pulley so as to drive said water pump from said crankshaft at a fixed speed ratio, a fan pulley rotatably mounted in axial alignment with said water pump shaft, a centrifugally actuated clutch arranged to couple said fan pulley to said water pump pulley at all engine speeds below a pre-determined speed and to release said fan pulley from said water pump pulley at all engine speeds above a pre-determined engine speed, a low speed pulley rotatably mounted in axial alignment with said crankshaft, an overrunning clutch disposed between said crankshaft and said low speed pulley, said overrunning clutch preventing said low speed pulley from rotating slower than said crakshaft and permitting said low speed pulley to rotate faster than said crankshaft, and a low speed belt extending around said low speed pulley and said fan pulley, said low speed belt driving said fan pulley at a reduced speed ratio when said centrifugally operated clutch is disenaged from said water pump pulley.

2. A device, as claimed in claim 1, wherein a generator is driven by said high speed belt and wherein another engine accessory is driven by said low speed belt.

3. A device, as claimed in claim 1, wherein a generator is driven by said high speed belt and wherein a power steering pump is driven by said low speed belt.

4. A device, as claimed in claim 1, wherein a generator is driven by said high speed belt and wherein an air conditioner compressor is driven by said low speed belt.

5. A device, as claimed in claim 1, wherein a generator is driven by said high speed belt and wherein both an air conditioner compressor and a power steering pump are driven from said low speed pulley.

6. A device, as claimed in claim 1, wherein said fan pulley is formed integrally with a clutch drum which is engaged by spring actuated clutch shoes mounted upon said water pump pulley.

7. A device, as claimed in claim 1, wherein said low speed pulley is rotatably mounted upon a shaft which is fixed to and extends forwardly from said engine crankshaft.

8. In a device of the character described, a motor vehicle engine having a crankshaft, water pump and cooling fan associated therewith, means for driving said water pump from said crankshaft at a fixed speed ratio, means for driving said fan from said crankshaft at a reduced speed ratio, and means for operatively clutching said water pump and fan at all engine speeds below a pre-determined speed to drive said fan from said crankshaft at all engine speeds below said pre-determined speed.

9. A device, as claimed in claim 8, wherein said means for operatively clutching said water pump and fan comprises a friction clutch.

10. A device, as claimed in claim 8, wherein said means for driving said fan from said crankshaft comprises an overrunning clutch which is rotatably mounted in axial alignment with said crankshaft.

11. A device, as claimed in claim 8, wherein said means for operatively clutching said water pump and fan comprises a friction clutch and wherein said means for driving said fan from said crank shaft comprises an overrunning clutch which is rotatably mounted in axial alignment with said crankshaft.

12. An engine having a water pump, fan, generator and power steering pump associated therewith, means for driving said water pump and generator from the crankshaft of said engine each at a fixed speed ratio relative to said engine, means for driving said fan and said power steering pump from said crankshaft each at a fixed speed ratio relative to said engine, said fan speed ratio being substantially less than said water pump speed ratio, and means for operatively coupling said fan and water pump together at all relatively low engine speeds, so that at such low engine speeds said fan will be driven at the same speed ratio relative to the crankashaft as is said water pump, said coupling means being rendered inoperative at high engine speeds so that, at such high speeds said fan and said power steering pump will be driven by said enigne at their respective reduced speed ratios.

13. In a device of the character described, a motor vehicle engine having a crankshaft, water pump and cooling fan associated therewith, means for driving said water pump from said crankshaft at substantially a one to one speed ratio, disengageable means for driving said fan from said crankshaft at a reduced speed ratio, and means for operatively clutching said water pump and fan together to drive said fan from said crankshaft at said one to one speed ratio when said disengageable means is disengaged.

14. A device, as claimed in claim 13, wherein said disengageable means comprises an overrunning clutch driven by said crankshaft.

References Cited in the file of this patent

UNITED STATES PATENTS

| | | |
|---|---|---|
| 2,860,519 | Cavanaugh | Nov. 18, 1958 |
| 2,901,924 | Banker | Sept. 1, 1959 |
| 2,910,891 | Heckethorn | Nov. 3, 1959 |
| 2,962,910 | Wolfram | Dec. 6, 1960 |
| 2,981,122 | Kelley | Apr. 25, 1961 |